United States Patent [19]

Bevan

[11] 3,914,359

[45] Oct. 21, 1975

[54] BUILDING OR CONSTRUCTIONAL MATERIAL

[75] Inventor: Christopher Graham Bevan, London, England

[73] Assignee: C. G. Bevan Associates Limited, London, England

[22] Filed: Apr. 4, 1973

[21] Appl. No.: 347,904

Related U.S. Application Data

[63] Continuation-in-part of Ser. No. 103,575, Jan. 4, 1971, abandoned.

[52] U.S. Cl. .......... 264/45.3; 264/333; 264/DIG. 7; 264/DIG. 43; 264/DIG. 57; 264/45.4; 264/46.5

[51] Int. Cl.......................... B28b 1/08; B28b 1/52

[58] Field of Search .......... 264/45, 333, 42, DIG. 7, 264/DIG. 57, DIG. 43; 260/2.5 B

[56] References Cited

UNITED STATES PATENTS

| | | | |
|---|---|---|---|
| 698,543 | 4/1902 | Norcross...................... | 264/DIG. 57 |
| 826,970 | 7/1906 | Stevans........................ | 264/DIG. 57 |
| 1,180,472 | 4/1916 | Clark ........................... | 264/DIG. 43 |
| 1,368,756 | 2/1921 | Ross............................. | 264/DIG. 43 |
| 1,704,193 | 3/1929 | Hoffman...................... | 264/DIG. 57 |
| 3,021,291 | 2/1962 | Thiessen...................... | 260/2.5 B |
| 3,211,675 | 10/1965 | Johnson....................... | 264/DIG. 7 |
| 3,257,338 | 8/1966 | Sefton.......................... | 264/DIG. 7 |
| 3,345,442 | 10/1967 | Oxel............................. | 264/DIG. 7 |
| 3,595,947 | 7/1971 | Wielinga...................... | 264/333 |
| 3,683,760 | 8/1972 | Silva ............................ | 264/333 |
| 3,770,859 | 11/1973 | Bevan .......................... | 264/333 |

Primary Examiner—Ronald W. Griffin
Attorney, Agent, or Firm—Kolisch, Hartwell, Dickinson & Stuart

[57] ABSTRACT

A method of making a building panel having a central layer of expanded polymer beads optionally mixed with liquid setting powder and outer layers of fibre-reinforced liquid setting powder. The constituents are introduced in a dry state in layers into a mould with the beads partially pre-expanded and then steam is caused to permeate through the dry constituents to provide heat for fully expanding the beads and liquid for activating the powder so that expansion of the beads causes the constituents to coalesce into a compacted product which can be rapidly demoulded.

13 Claims, 6 Drawing Figures

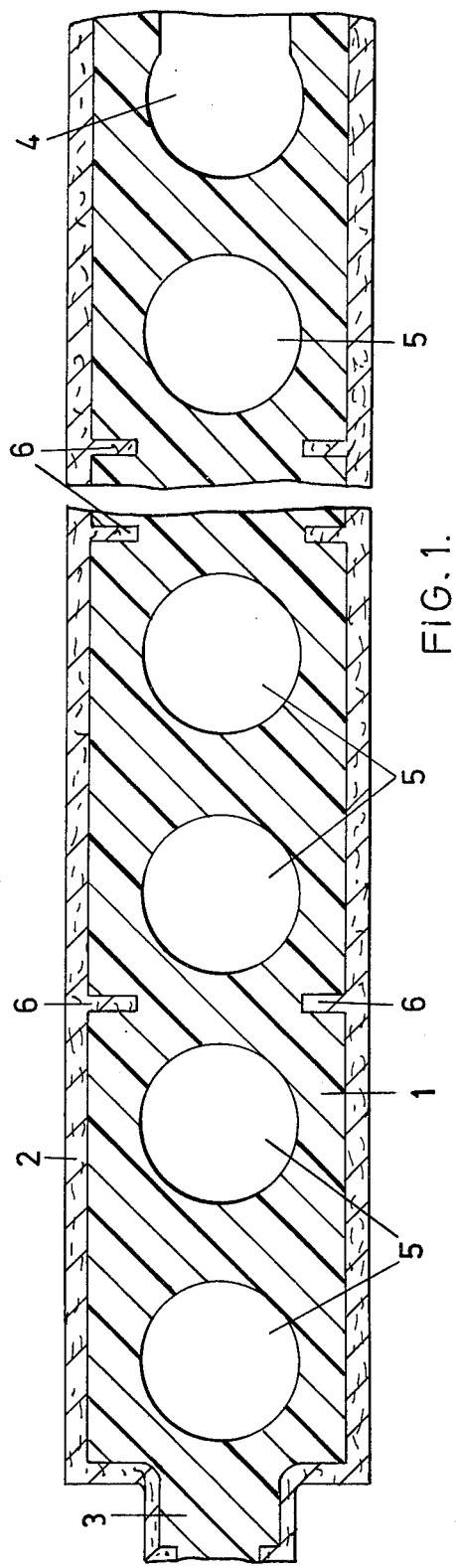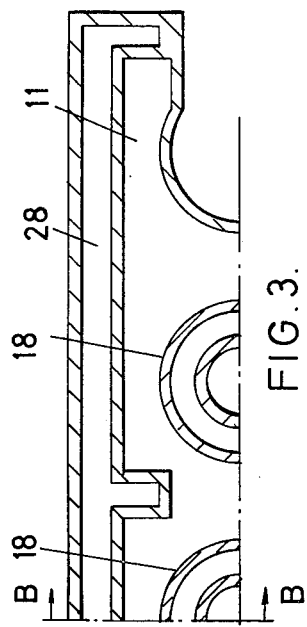

BUILDING OR CONSTRUCTIONAL MATERIAL

This invention relates to a method of forming building panels and is a Continuation in Part of my earlier application Ser. No. 103,575, filed Jan. 4, 1971, now abandoned, and titled "Building or Constructional Material."

It is an object of the invention to provide a convenient method of manufacturing light-weight building panels having outer layers of fibre-reinforced liguid setting powder, normally cement and an inner weight-reducing core of an expanded polymer.

Prior art methods of producing sandwich panels of this type have generally entailed wet mixing of the constituents, admitting the wet constituents to a mould in layers, applying external mechanical pressure to the constituents in the mould and finally demoulding after the lengthy setting time required by the cement.

It is a further object of the present invention to improve on the prior art processes for producing this type of sandwich panel, particularly by simplifying the mixing and moulding phases, whilst ensuring uniformity of composition and by eliminating the need to retain the constituents in the mould until complete setting of the cement has taken place allowing the product to be demoulded far more quickly than in conventional processes.

According to the invention, the powder and fibres are mixed together in a dry state and admitted dry to a mould in layers sandwiching an inner layer containing dry partially-expanded cellular beads of a heat-expansible polymer which may optionally also be mixed with powder. When the constituents are in the mould, steam is caused to permeate therethrough to provide heat for completing the expansion of the beads and liquid for moistening the powder. Because of the dryness of the powder the steam can readily permeate through the powder particles.

Where the central layer comprises pure beads, the expansion of the beads caused by the steam permeation creates internal pressures within the mould which fuses the expanded and softened beads together into a composite expanded polymeric mass (in a manner akin to a conventional expansible polymer moulding process) and the liquid derived from the condensing steam permeates the outer powder layers to initiate a chemical setting reaction in the powder. Further, compaction of the powder layers is produced by expanding bead mass and, due to this and the cellular nature of the expanding bead mass, a mechanical inter-layer bond (which can be improved by providing keying formations in the layers) is formed between the central bead mass and the outer powder layers when these are moistened by the condensing steam.

Similar considerations apply when the central layer contains a mixture of beads and powder except that the expanded beads in the central layer become embedded in a powder matrix with fusion between individual beads taking place only in areas originally in point to point contact at the initiation of steaming and the beads thereof expanding beyond the spherical point to point contact state into a distorted polygonal state trapping and compressing the dampened powder in the con-contacting areas between the individual beads. This tight interlocking between the constituents effects a sufficient mechanical bond to facilitate rapid demoulding before the powder has set. The bond is finally secured by completion of the powder set.

After the application of the steam to the dry constituents in the mould has progressed for a certain time, the expansion of the polymeric material and the moistening of the powder will effectively prevent by clogging the permeation of further steam. This time is generally from 1 to 2 minutes provided the steam flow is evenly spread through the mould and it has been found that this time period is adequate to produce sufficient moisture by condensation to dampen the powder into an adherent state so that the resultant product can be demoulded after the steaming operation without having to wait until curing or setting of the powder is complete. If necessary for complete hydration of the powder outer layers further moisture can be applied after demoulding.

The degree of pre-expansion of the beads before admission to the mould depends on the required density of expanded polymer in the final product because the smaller the bead volume on admission to the mould, the more beads will be required to fill a given volume resulting in greater cost. For example for general applications it has been found convenient when using beads originally of between 1 and 2 mm. in diameter in the unexpanded state, to pre-expand these before admission to the mould to about 30 times their original volume. Then, it is necessary to provide adequate filling of the mould to ensure that the expanding beads will create sufficient internal pressure to form a coherent mass. Generally it is sufficient completely to fill the mould with the constituents so that these are constrained in all directions.

Any liquid setting powder is suitable for use in the process for the outer layers, although this will generally be a commercial Portland type cement such as that conforming with the requirements of British Standard Specification No. 12. Rapid hardening and Portland blast furnace cement can also be used as could cements with various inert or mildly reactive fillers such as pulverised fuel ash.

The purpose of the fibrous material is to reinforce the outer layers to provide sufficient tensile strength, and in the case of asbestos fibres, the fibres should account for say approximately 10 to 25 per cent of the outer layer weight. A wide range of materials, grades and lengths can be used dependent on the strength requirements, for example asbestos fibres, glass fibres, jute or other vegetable fibres are suitable. For general building purposes, asbestos fibres of grades 4T30 and 6D30 as defined by the Quebec Standard Screen Text are suitable.

Any polymer beads capable of heat expansion can be used, such as expandable polyethylene, alpha methyl styrene or styrene acrylonitrile copolymers. It is preferred however to use polystyrene beads incorporating an expanding agent such as pentane.

The constituents can be introduced by simple pouring in horisontal layers into a static or batch-type mould having a lid or cover but this can lead to a non-uniform product because the powder being substantially heavier than the beads tends to sink to the base of the mould and upwardly displace the beads. Therefore it is preferred to introduce the constituents to the mould in vertically moving columns with sufficient pressure being applied to the central bead column to produce outward pressure on the outer powder columns to counteract their tendency to collapse inwardly by displacing the beads upwards. In practice this effect is achieved by confining the outer surfaces of the outer columns and applying downward pressure to the central column whilst the columns flow downwardly into the mould which incorporates a downwardly moving column supporting base member.

This confinement and pressurization of the columns also allows proper infiltration of powder into the central column where this is required for a bead and powder combined central layer, by preventing the infiltrated powder from dropping, falling through the bead column and merely displacing beads upwardly.

The steam introduction can take place through perforated mould walls or through coreforming tubes within the mould. The steam pressure should be kept as close as possible to atmospheric to avoid temperatures rising significantly above 100°C which is the plastic yield point of most commercially available polystyrene. Where the central layer comprises a mixture of beads and powder, it may be necessary slightly to increase the steam pressure to ensure adequate permeation through the powder.

Mould temperatures are not critical, and generally the mould can be maintained at atmospheric temperature although some cooling facility is preferred for long production runs to prevent overheating of the mould walls which could hamper steam condensation within the material.

The invention will now be described by way of example with reference to the accompanying drawings which illustrate a method of producing polystyrene-cored sandwich panels for building purposes, with Portland cement outer layers and integrally formed edge tongue and grooves, in a continuous process using basic raw materials i.e. polystyrene beads and cement powder. In the drawings:

FIG. 1 is an end view of a completed sandwich panel produced by the process;

FIG. 3 is a part sectional plan view of the apparatus along line B—B of FIG. 2;

Figure 2:
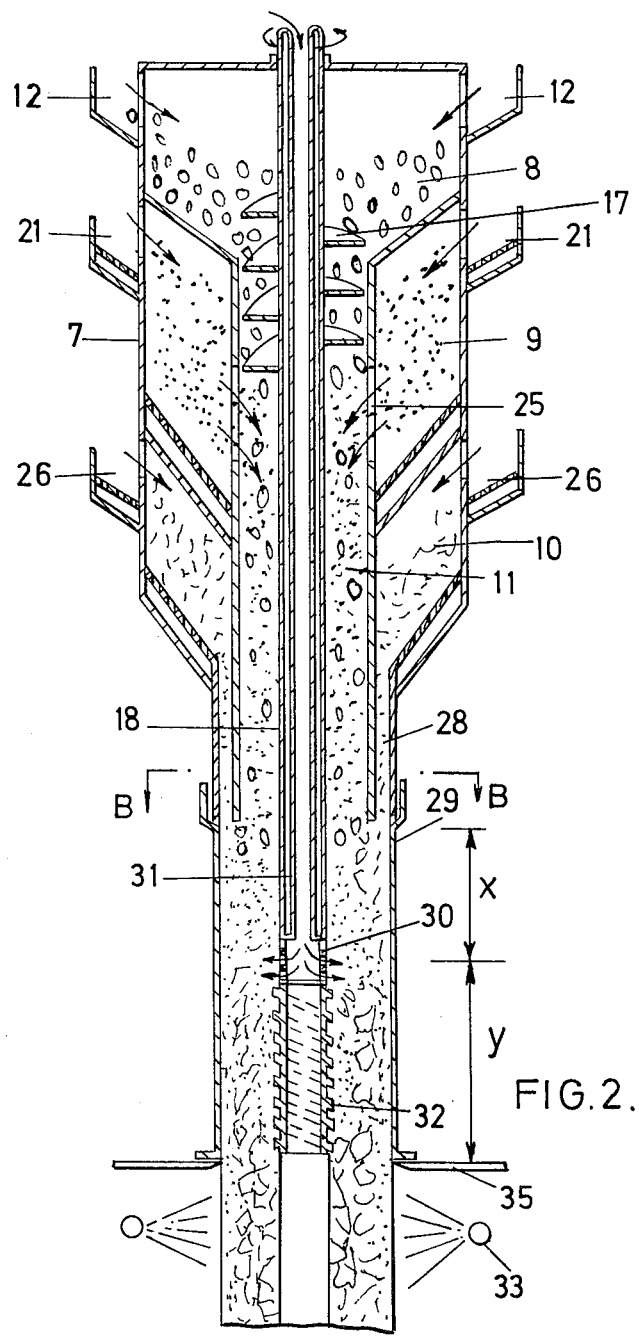
FIG. 2 is a semi-diagrammatic sectional view through apparatus used for producing the panels.

Referring firstly to FIG. 1, the finished sandwich panel comprises a central insulating core 1 in the form of a cellular structure of expanded polystyrene beads embedded in a binding matrix of cement powder, and an outer skin 2, formed from a mixture of cement, pulverised fuel ash, and a blend of long and short asbestos fibres, the skin being sprayed on its outer surface with a finishing compound which may for example comprise a mixture of white cement, water, very fine asbestos powder and pigments.

The panel is moulded to provide at its opposed edges a complimentary tongue and groove 3 and 4, and the core has longitudinally extending through bores 5 whilst the skin has spaced internally projecting ribs 6. The panel may for example have an overall width of about one foot, an overall length of from 8 to 10 feet and a thickness of about 2 inches.

A method of means for producing panels as described above, on a continuous basis is shown in FIG. 2 and 3 to which reference will now be made.

A vertically vibrating structure 7 is divided vertically into a series of three supply hoppers 8, 9 and 10 disposed about a core forming duct 11 that conforms in cross section (see FIG. 3) to the cross section of the core 1 of the panel. The uppermost hopper 8 is supplied with pre-expanded polystyrene beads through lateral feeders 12 from a first supply bin which in turn receives the beads through a pipe from a pre-extender having a bead blower. Then, the beads are fed into the duct 11 by screw feeders 17 arranged around the periphery of a series of hollow bore forming tubes 18 corresponding in number to the number of bores 5 in the completed panel and spaced accordingly. The tubes 18 are rotated by gears (not shown), and the purpose of the feed screws is to maintain pressure on the polystyrene beads and prevent their upward displacement as heavier cement powder is fed into the duct 11 below the bead hopper to mix with the beads as will be described.

The central hopper 9 of the vibratory structure contains the cement powder constituent of the panel core 1, the powder being in a dry state and being received from a second supply bin through lateral feeders 21. The base of each lateral feeder 21 is perforated and is supplied from below with compressed air from a mixer-blower unit 22 (see FIG. 5). The compressed air "fluidises" the fine cement powder in the feeders 21 and this action combined with the vibration of the feeders imposed by the vibratory structure 7 assists in the conveying and flow of the fine powder from the bin 20 into the hopper 9 overcoming "bridging" or "clogging" effects. The feeders 21 and 12 are flexible to accommodate the vibrations.

The floor of hopper 9 is also perforated and supplied with compressed air from below through pipe 23 leading from a compressor 24. Thus the cement in hopper 9 is also fluidised to assist its flow into the duct 11 through vents or slits 25 in the duct wall, the slits or vents being sufficiently narrow to prevent the polystyrene beads in duct 11 from flowing in the hopper 9. The vibration of the structure 7 together with the fluidisation of the cement powder thus introduces the cement powder into the duct 11 where through the continuous vibration it fills the spaces between the polystyrene beads, the resultant bead and powder mixtures being gradually vibro-compacted as it proceeds down duct 11.

The lowermost hopper 10 of the vibratory structure contains dry cement-ash-fibres mixture for the panel outer skin, the mixture being supplied through feeders 26 from a cement hopper and a fibre-ash hopper and these constituents being mixed by a mixer (not shown). The floor of each feeder 26 as well as the floor of hopper 10 is perforated for fluidisation of the mixture for the purpose described above, the mixture flowing down a duct 28 formed at the base of hopper 10 between the duct 11 and the outer wall of the vibratory structure. As shown in FIG. 3, the duct 28 is shaped to conform to the shape of the outer skin of the panel.

Below the vibratory structure is a stationary mould 29 conforming in outside shape to the outside shape of the panel and into the top of which the ducts 11 and 28 discharge their respective dry mixtures. It will be seen that each tube 18 continues down through the length of the mould and has ports 30 through which steam from an internal steam pipe 31 issues, the pipes 31 being supplied from a steam generator not shown. The steam permeates through the dry mixtures in the mould and supplies the heat required for converting the polystyrene beads from their pre-expanded to their fully expanded state, as well as supplying moisture (by condensation) for conversion of the dry cement powder. Expansion of the beads creates internal pressure within the mould to form the panel core material into a cohesive cellular structure having expanded polystyrene cells embedded in a binding matrix of cement, and to mould the dampened cement-fibrous material forming the panel skin.

Below the ports 30, each tube 18 terminates in a drive screw 32 which bites into the cellular mass of the ocre material and delivers the panel from the mould at a steady preselected rate dependent on the rate of rotation of the tubes 18. It is in fact the screws 32 which regulate the rate of flow of all the panel constituents through the apparatus due to their purchase on the solidifying panel section resulting from the steaming operation.

The heights x and y of the mould above and below the steaming ports respectively should be sufficient to ensure that all the steam is condensed and absorbed before it can reach the ducts 11 and 28 and that sufficient tightening of the core takes place to prevent escape of steam from the bottom of the mould. The height y should also be sufficient for a certain degree of cooling and curing of the cement to take place before the panel issued from the mould.

On emission from the mould additional water frequently has to be sprayed or otherwise applied to the outer layers to supplement the condensed steam, in order to achieve sufficient water content to complete the chemical reaction.

Figure 4:
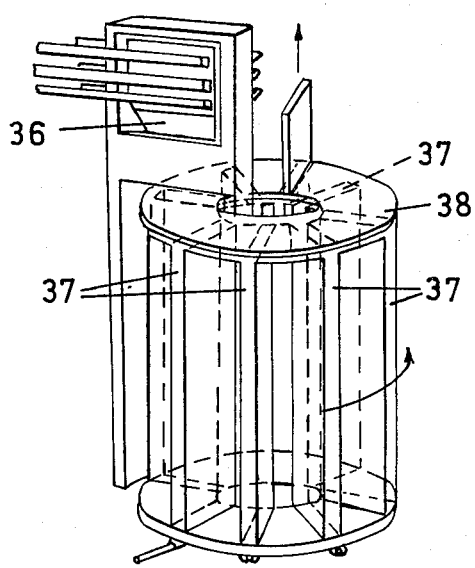
FIG. 4 is a perspective view of an alternative form of apparatus for producing panels as shown in FIG. 1.
Figure 5:
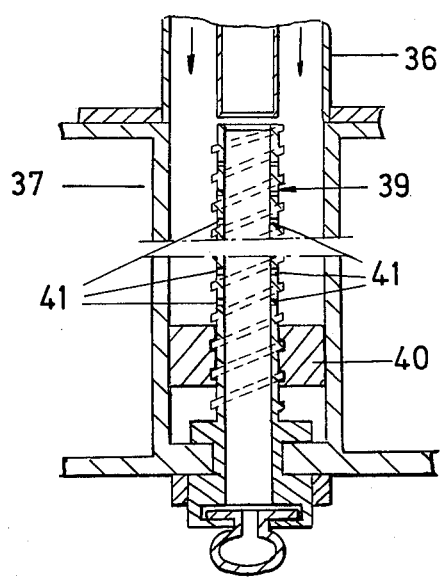
FIG. 5 is a sectional view through one of the moulds shown in FIG. 4 whilst it is in register with the material supply device.

In the arrangement shown in FIGS. 4 and 5, a vibratory structure 36, similar to the structure 7 in FIG. 3 supplies the constituents in turn to a series of batch-type moulds 37 formed in a turntable arrangement 38, as each mould is brought in turn into register with the feeder 36. Internally the moulds are formed with a hollow screw 39 formed with steam ports 41 and carrying a plunger 40. When a mould is in register with the feeder, the plunger is lifted by rotation of the screw and as the material layers are introduced, the plunger is lowered. After filling, the mould is moved away from the feeder, steam is introduced through the screw, and then for demoulding the finished product the plunger is again lifted.

Figure 6:
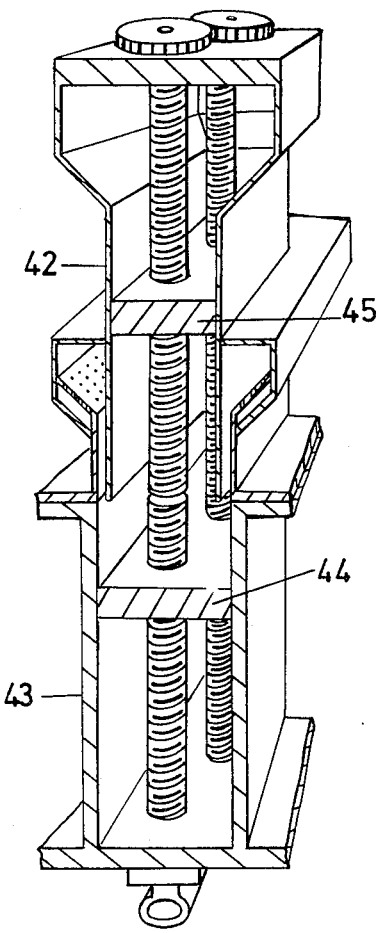
FIG. 6 is a sectional perspective view through a further alternative form of apparatus for producing panels as shown in FIG. 1.

FIG. 6 shows an arrangement for making a simplified form of panel having a pure polystyrene core and fibre reinforced cement skin. A vibratory structure 42 is employed which is a simplified version of structure 7, and a mould 43 having a screw plunger-cum-steaming system 44 similar to that illustrated in FIGS. 4 and 5. Also in this case, the vibratory structure has screw plungers 45 taking the place of the feed screws 17 of the first embodiment to maintain pressure on the dry polystyrene column to prevent the inward collapse of the dry skin forming cement powder in regions of the apparatus after it leaves its enclosing ducts and before it comes under the steaming action. Other pressure applying means such as piston operated plungers can also be used for this purpose.

It is also possible for simple layered panels to manually introduce the constituents layer by layer into a static mould to form horizontal layers and then to introduce steam to the material by perforations in the mould walls and suitable steam header arrangements or by tubes inserted into the mould.

In carrying out the invention according to one specific example, a panel of the type shown in FIG. 1 was produced in apparatus as described in relation to FIG. 6. The outer layers were formed from a mixture of 80 per cent by weight of Portland cement and 20 per cent of 4T30 asbestos fibre. The central layer material comprised polystyrene beads having a bead diameter before pre-expansion in the range of 1 to 2 mm. The overall thickness of the panel was 50 mm and the thickness of each outer layer was about 5 mm. The core holes were 25 mm diameter at 40 mm centres and the outer layers were keyed to the central layer by 5.5 mm ribs at 40 mm centres spaced between the core holes.

To pre-expand the polystyrene beads steam was at a pressure between 0.15 and 0.35 kg/sq. cm. passed through the beads for 2½ minutes. The pre-expanded beads were then kept at ambient temperature and pressure for 24 hours before being used for the moulding process.

The panel constituents were introduced to a mould of the type shown in FIG. 6 and then steam at about 1 kg/sq. cm. was allowed to permeate through the material from the screw steam inlets for about 1½ minutes. The inlet tubes were then vented to atmosphere and the mould was allowed to cool at atmospheric temperature for 20 – 30 minutes after which the completed panel was demoulded.

Although after this time, the cement hydration process had only just commenced, the outer layers were found to be sufficiently dampened and compressed by the steaming and bead expansion to remain firmly intact on the fused polystyrene core so as to allow long term curing of the cement to take place externally of the mould. The component was then stored under moist conditions for three weeks to complete the cement cure.

I claim:

1. A method of forming a panel product from constituents including a mixture of liquid setting powder and a fibrous reinforcing material, and partially heat-expanded cellular beads of a heat-expansible polymer, said method comprising
    introducing said constituents in a dry, flowable state into a mould in layers including a first layer comprising said powder and fibre mixture, and a second layer comprising said beads,
    while confining the introduced constituents within the mould, permeating the constituents with steam,
    by said permeating simultaneously moistening the powder and heating the beads, and
    by said moistening, effecting setting of the powder, and by said heating, simultaneously expanding the beads to apply internal pressure on all of the constituents within the mould, which pressure compacts the constituents into a coherent mass forming said panel.

2. The method of claim 1 wherein said beads are partially heat expanded to about 30 per cent of their total expansion before introduction to said mould.

3. The method of claim 1 wherein permeating of the constituents with steam takes place from within the mould.

4. The method of claim 1 wherein said layers are introduced into said mould while flowing in vertical columns.

5. The method of claim 4 wherein the powder and fibre mixture is prepared by fluidizing the powder flowing in one vertical column and introducing the fibre into the vertically moving column of fluidized powder.

6. The method of claim 4 wherein said columns comprises outer columns containing said powder and a central column containing beads and wherein pressure is applied to said central column to prevent inward collapse of said outer columns.

7. The method of claim 6 wherein powder is allowed to infilrate into the central column while said pressure is maintained on said central column to produce a combined bead and powder central panel layer.

8. The method of claim 1 wherein the layers are introduced into the mould while flowing in vertical columns, and said constituents are moved continuously through said mould at a controlled rate wile said steam is caused to permeate therethrough.

9. The mithod of claim 8, wherein the rate of movement of said constituents through said mould is controlled by controlling the rate of movement out of the mold of a compacted, cohered portion of said constituent.

10. The method of claim 1 wherein after steam permeation the mould is allowed to cool before removal of said compacted coherent mass.

11. The method of claim 10 wherein sufficient additional moisture is applied to said first layer after removal from the mould to complete hydration of the powder.

12. A method of forming a panel product from constituents including a mixture of liquid setting powder and a fibrous reinforcing material, and partially heat-expanded cellular beads of a heat-expansible polymer, said method comprising introducing said constituents in a dry, flowable state into a mould in layers, including a first layer comprising said powder and fibre mixture, a second layer comprising said beads, and a third layer also comprising said powder and fibre mixture, with said second layer sandwiched between said first and third layers, while confining the introduced constituents within the mould, permeating the constituents with steam, by said permeating simultaneously moistening the powder and heating the beads, and by said moistening, effecting setting of the powder, and by said heating, simultaneously expanding the beads to apply internal pressure on all of the constituents within the mould, which pressure compacts the constituents into a coherent mass forming said panel.

13. The method of claim 12 wherein said second layer contains said beads mixed with liquid setting powder.

* * * * *